(12) United States Patent
Tanimoto et al.

(10) Patent No.: US 6,315,456 B1
(45) Date of Patent: Nov. 13, 2001

(54) BEARING RETAINER OF SYNTHETIC RESIN, METHOD OF MANUFACTURING THE SAME AND ROLLING BEARING

(75) Inventors: Kiyoshi Tanimoto; Kunio Yanai, both of Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/423,069

(22) PCT Filed: Jun. 29, 1998

(86) PCT No.: PCT/JP98/02949

§ 371 Date: Nov. 1, 1999

§ 102(e) Date: Nov. 1, 1999

(87) PCT Pub. No.: WO99/01676

PCT Pub. Date: Jan. 14, 1999

(30) Foreign Application Priority Data

Jul. 1, 1997 (JP) .................................................. 9-175776

(51) Int. Cl.$^7$ .............................. F16C 33/44; F16C 33/38
(52) U.S. Cl. ........................ 384/527; 384/523; 384/909; 384/911; 29/898.067
(58) Field of Search ..................................... 384/523, 527, 384/908, 909, 911; 29/898.067

(56) References Cited

U.S. PATENT DOCUMENTS

| 5,118,207 | * | 6/1992 | Ikejiri et al. | 384/527 |
| 5,558,448 | * | 9/1996 | Yabe et al. | 384/527 |
| 5,575,570 | * | 11/1996 | Uchiyama et al. | 384/527 |

FOREIGN PATENT DOCUMENTS

| 3-117722 | * | 5/1991 | (JP) . |
| A4248021 | | 9/1992 | (JP) . |
| A4277319 | | 10/1992 | (JP) . |

* cited by examiner

Primary Examiner—David A. Bucci
Assistant Examiner—William C. Joyce
(74) Attorney, Agent, or Firm—Birch, Stewart, Kolasch & Birch, LLP (57) ABSTRACT

A bearing retainer of a synthetic resin, which can be injection molded out of a material obtained by mixing at least particles of a heat resisting reins with a thermoplastic resin, and which can thereby be manufactured at a low cost without compromise in suitability for high-rotational-speed and high-temperature applications.

23 Claims, 9 Drawing Sheets

BEARING RETAINER OF SYNTHETIC RESIN, METHOD OF MANUFACTURING THE SAME AND ROLLING BEARING

This application is the national phase under 35 U.S.C. §371 of PCT International Application No. PCT/JP98/02949 which has an International filing date of Jun. 29, 1998, which designated the United States of America.

TECHNICAL FIELD

This invention relates to a bearing retainer of a synthetic resin, and more particularly, to a retainer which is suitable for use in a rolling bearing for supporting a shaft rotating at high speeds and high temperature, a method of manufacturing the same, and a rolling bearing.

BACKGROUND ART

Brass, or special metals for aircraft (AMS 4616 or 6414) have, for example, been used for making a retainer for a bearing used for supporting a shaft rotating at a high speed at a high temperature, for example, the shaft of a machine tool, or of a gas turbine for a supercharger, or power generator.

The retainers formed from metallic materials as mentioned have, however, only a limited possibility of reduction in weight. There are known, for example, a retainer formed from a material obtained by impregnating a cotton cloth with a phenolic resin, and a retainer formed from a synthetic resin, such as a thermosetting polyimide resin, as retainers of lighter weight.

The retainers formed by using a phenolic resin have, however, been difficult to manufacture at a low cost on a mass-production basis because of a great deal of labor and time required for their manufacture, as the thermosetting property of the phenolic resin does not permit injection molding, and as a separate job is required for making pockets.

The retainers of a thermosetting polyimide resin have also been expensive to manufacture, since their manufacture also relies upon turning.

It is, therefore, an object of this invention to provide a bearing retainer of a synthetic resin which is suitable for use in a situation involving a high speed of rotation at a high temperature, and which can be manufactured at a low cost.

It is another object of this invention to provide a bearing retainer of a synthetic resin which can be manufactured easily by injection molding without relying upon any separate job for the formation of pockets, and without relying upon any turning job.

It is still another object of this invention to provide a method which can manufacture a bearing retainer of a synthetic resin at a low cost.

It is a further object of this invention to provide a rolling bearing which includes a retainer of a synthetic resin as mentioned above, and is suitable for use in a situation involving a high speed of rotation at a high temperature.

[Essential Features]

The bearing retainer of a synthetic resin according to this invention is formed by injection molding from a material prepared by mixing a thermoplastic resin and particles of a heat-resisting resin.

The bearing retainer according to this invention is preferably formed from a material further including reinforcing fibers.

The thermoplastic resin is preferably selected from among polyether ether ketone (PEEK), polyether ketone (PEK), polyether sulfone (PES), polyether imide (PEI), polyamide-imide (PAI), polyphenylene sulfide (PPS), polyallyl ether nitrile (PEN) and a thermoplastic polyimide resin (TPI), and a mixture thereof, while polybenzimidazole (PBI) is used as the heat-resisting resin.

[Advantages]

A retainer of a thermoplastic resin can be made by injection molding, but can withstand use only at a relatively low temperature. A retainer of a heat-resisting resin can withstand use at a relatively high temperature, but as it cannot be made by injection molding, there is no alternative but to rely upon turning for making it despite its higher cost.

The retainer of this invention can be made by injection molding owing to the thermoplastic resin which its material contains, though it also contains the heat-resisting material, while it can withstand use at a high temperature owing to the heat-resisting material.

If its material further contains reinforcing fibers, the retainer is further improved in strength and heat resistance.

BEST MODE OF CARRYING OUT THE INVENTION

The invention will now be described in detail based on its preferred forms of embodiment as shown in FIGS. 1 to 12.

Figure 1:
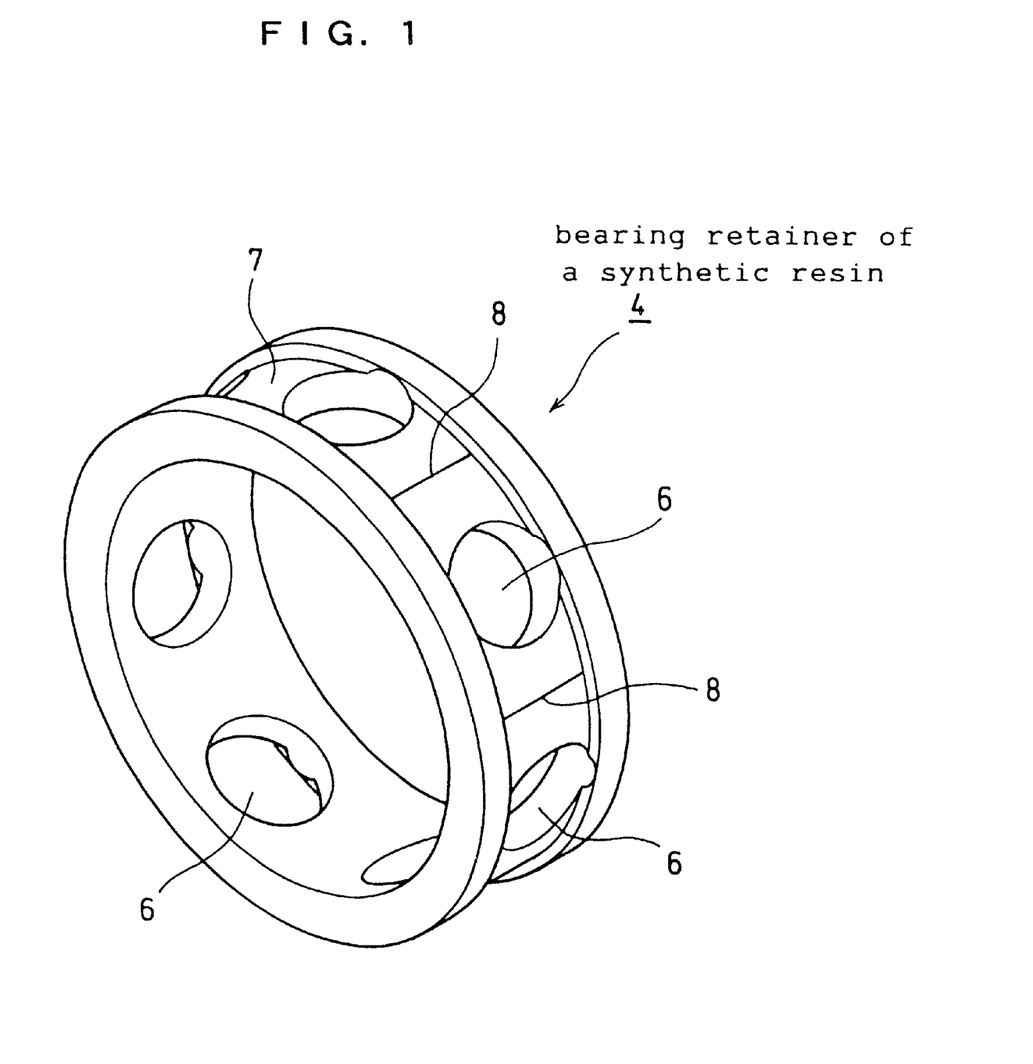
FIG. 1 is a perspective view of a bearing retainer according to a first preferred form of embodiment.
Figure 2:
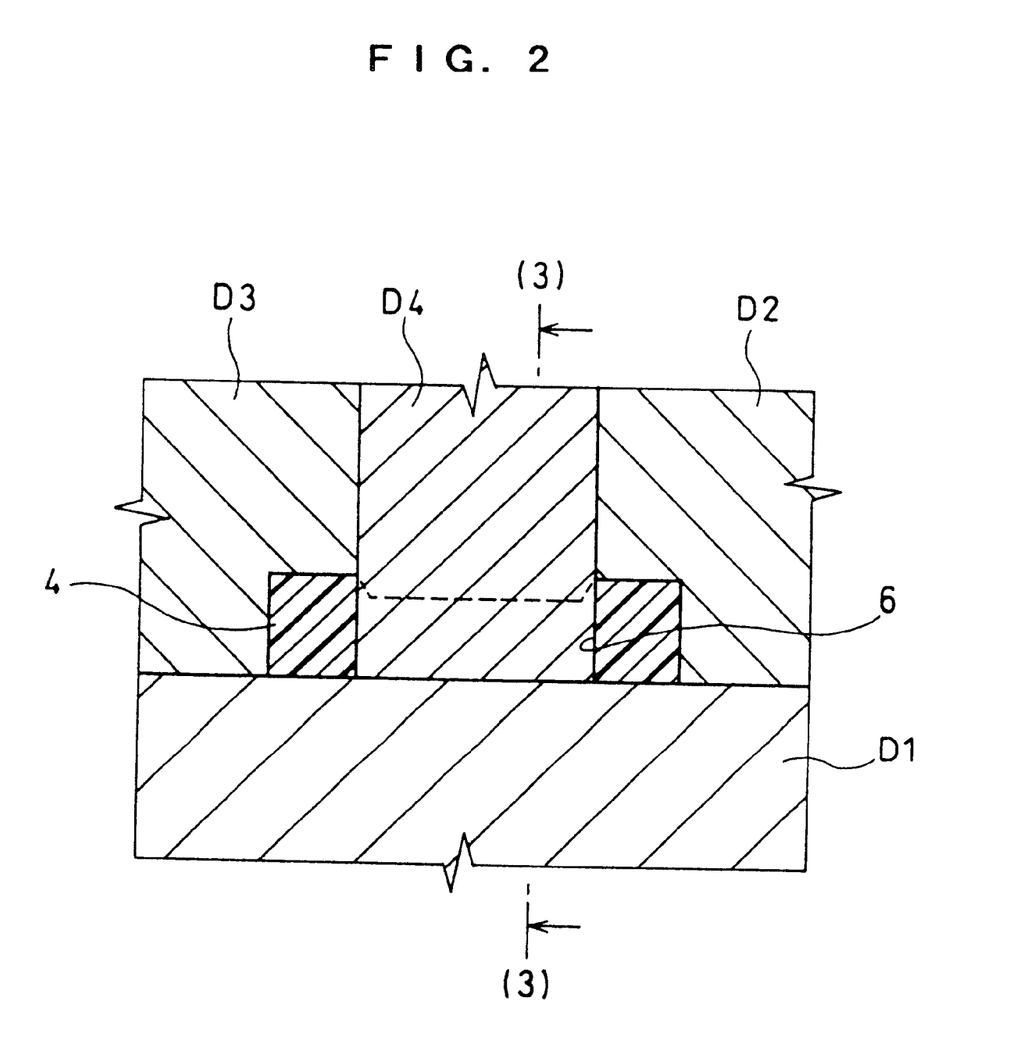
FIG. 2 is a transverse sectional view of a mold used for forming the retainer shown in FIG. 1.
Figure 3:
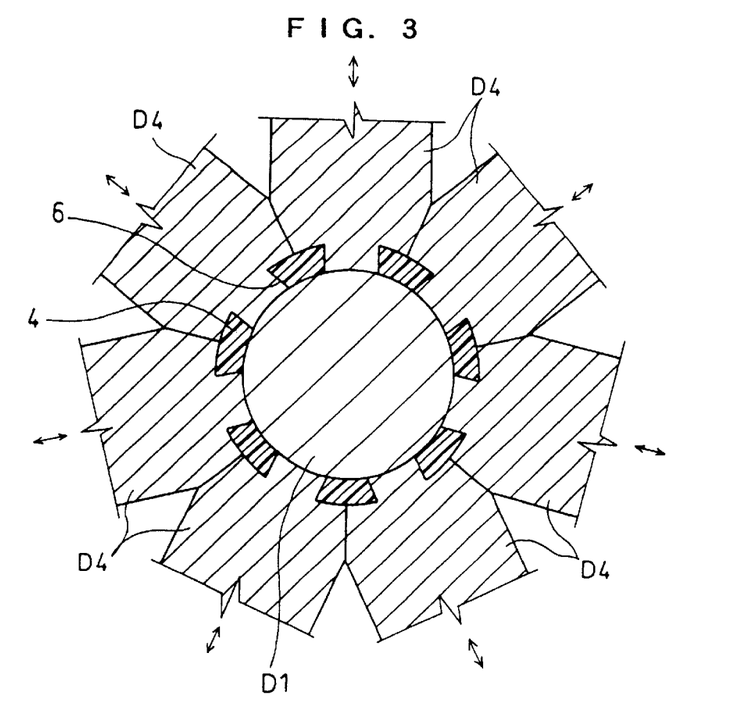
FIG. 3 is a sectional view taken along the line (3)—(3) of FIG. 2.
Figure 4:
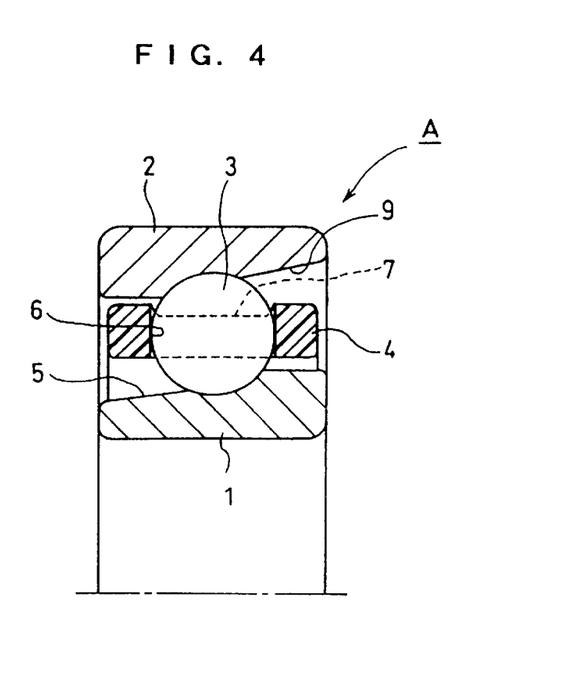
FIG. 4 is a longitudinal sectional view of an upper half of a rolling bearing including the retainer of FIG. 1.

One of its preferred forms of embodiment is shown in FIGS. 1 to 4, in which FIG. 1 is a perspective view of a bearing retainer formed from a synthetic resin, FIG. 2 is a longitudinal sectional view of a mold used for forming the retainer shown in FIG. 1, FIG. 3 is a sectional view taken along the line (3)—(3) of FIG. 2, and FIG. 4 is a longitudinal sectional view of an upper half of a rolling bearing including the retainer of FIG. 1.

A description will first be made of the construction of the rolling bearing in which the retainer of this invention is used. Referring to FIG. 4, the rolling bearing A comprises an inner race 1, an outer race 2, a plurality of balls as rolling elements 3, and a retainer 4. The rolling bearing A is an angular ball bearing of the type in which the retainer 4 is guided by the inner surface of the outer race 2.

Figure 5:
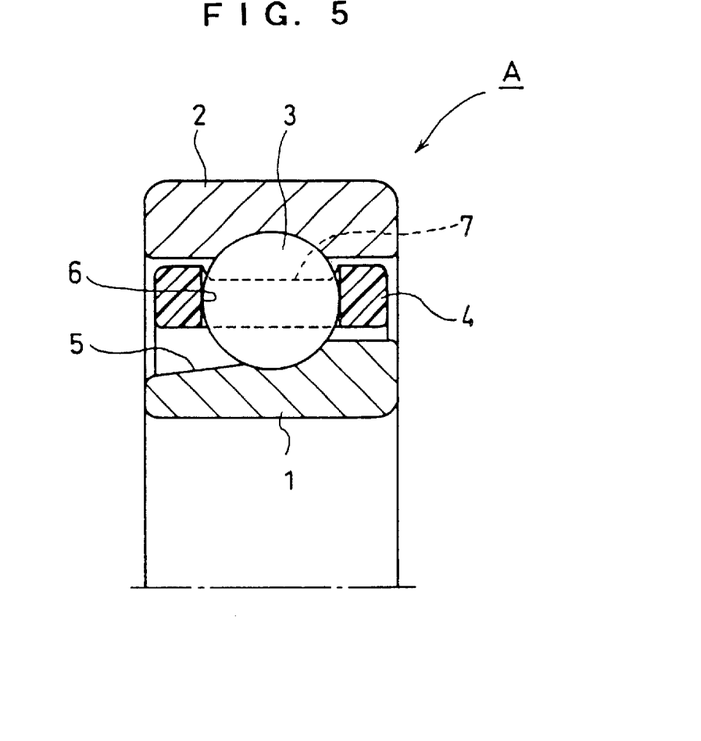
FIG. 5 is a longitudinal sectional view of an upper half of a modified form of a rolling bearing including the retainer of FIG. 1.

The inner race 1 has a counterbore 5 formed in its outer surface along one shoulder, while the outer race 2 has a counterbore 9 in its inner surface along one shoulder on the opposite side of the balls from the counterbore 5. Each of the counterbores 5 and 9 is tapered from a protrusion defining a track groove for the balls 3 in the inner race 1. The outer race 2 has its track groove formed in its axially central portion. FIG. 5 shows a modified form of bearing in which only the inner race 1 has a counterbore 5.

The retainer 4 is formed from a synthetic resin, is of the so-called counterbored type, and has a plurality of circumferentially equally spaced apart and radially extending pockets 6 and an annular groove 7 formed in the axially central portion of its outer periphery, as shown in FIG. 1. The retainer 4 is made by injection molding in a mold comprising a plurality of portions D1 to D4 as shown in FIGS. 2 and 3. A linear burr 8 (parting line) is formed on the molded product between every two adjoining mold portions D4, and appears upon radial removal of the mold portions D4. The retainer 4 is, therefore, so molded that the linear burrs 8 may be formed on the bottom of the annular groove 7 each between two adjoining pockets 6, as shown in FIG. 1, so that no such burr may be formed on the guide surface of the retainer 4 and scrape a lubricant off the inner surface of the outer race 2.

The retainer 4 is injection molded from a material prepared by mixing a thermoplastic resin and particles of a heat-resisting resin, or from a material prepared by mixing a thermoplastic resin, particles of a heat-resisting resin and reinforcing fibers.

The following is a further description of the materials.

At least one of polyether ether ketone (PEEK), polyether ketone (PEK), polyether sulfone-(PES), polyether imide (PEI), polyamideimide (PAI), polyphenylene sulfide (PPS), polyallylethernitrile (PEN) and a thermoplastic polyimide resin (TPI) is used as the thermoplastic resin.

Polybenzimidazole (PBI) is used as the heat-resisting resin.

Examples of the reinforcing fibers are carbon, glass, boron and aramid fibers, whiskers, and fibers formed from other inorganic materials (such as silicon oxide, carbide or nitride, or alumina), or organic materials (such as polyethylene or polyallylate).

More specifically, it is possible to use a mixture consisting of 35% (±2%) by weight of polyether ether ketone (PEEK) as the thermoplastic resin, 35% by weight of polybenzimidazole (PBI) as the heat-resisting resin and 30% by weight of carbon fibers as the reinforcing fibers. Celazole TF-60C, product of Hoechst-Celanese Corporation of U.S.A., can be used as polybenzimidazole (PBI). The properties of Celazole TF-60C are shown in Table 1 below.

TABLE 1

| | Conditions | ASTM | Unit | Value |
|---|---|---|---|---|
| Tensile strength | 23° C. | D638 | kg/cm$^2$ | 2030 |
| Tensile modulus | 23° C. | D638 | kglcm$^2$ | 21.7 × 10$^4$ |
| Elongation | 23° C. | D638 | % | 1.7 |
| Flexural strength | 23° C. | D790 | kg/cm$^2$ | 3220 |
| | 288° C. | D790 | kg/cm$^2$ | 539 |
| Flexural modulus | 23° C. | D790 | kg/cm$^2$ | 20.3 × 10$^4$ |
| | 288° C. | D790 | kg/cm$^2$ | 3.1 × 10$^4$ |

TABLE 1-continued

| | Conditions | ASTM | Unit | Value |
|---|---|---|---|---|
| Compressive strength | 23° C. | D695 | kg/cm$^2$ | 2240 |
| Compressive modulus | 23° C. | D695 | kg/cm$^2$ | 3.9 × 10$^4$ |
| Coefficient of thermal expansion | 24–150° C. | TMA | 1/° C. | 2.6 × 10$^{-5}$ |
| Thermal deformation temperature | 18.5 kg/cm$^2$ | D648 | ° C. | 326 |
| Thermal conductivity | 24° C. | F433 | kcal/mh° C. | 0.39 |
| Density | | | g/cm$^3$ | 1.4 |

The materials as stated above are used in combination, so that the retainer 4 can be used at a high temperature and a high speed of rotation, and can also be manufactured at a low cost. For information, the retainer 4 as described above can withstand continuous use at a temperature of, say, 200° C. to 250° C., and a short time of use at 300° C.

It is, however, preferable that the inner and outer races 1 and 2 and the balls 3 be also formed from high-carbon chromium bearing steel (such as SUJ2 according to JIS), or a heat-resisting, or ceramic material as mentioned below, so that the rolling bearing A can be used at a high temperature and a high speed of rotation.

Examples of the heat-resisting materials are martensitic stainless steel (such as SUS440C or SUS420C according to JIS), a heat- and corrosion-resistant alloy (such as M-50 according to AISI or high-speed tool steel SKH4 according to JIS), and heat-resisting bearing steel as shown in Japanese Patent Application Laid-Open No. 3-253542, and they are subjected to appropriate hardening treatment (such as quenching and tempering), if required. More specifically, the heat-resisting bearing steel mentioned above contains 0.8 to 1.5% by weight of C, 0.5 to 2.0% by weight of Si, 0.3 to 2.0% by weight of Mn, 1.3 to 2.1% by weight of Cr and 0.3 to 1.0% by weight of Mo, Si and Mo making a total of at least 1.0% by weight, and the balance of its composition being iron and unavoidable impurities.

Examples of the ceramics are a material consisting mainly of silicon nitride ($Si_3N_4$) and containing yttria ($Y_2O_3$) or alumina ($Al_2O_3$) as a sintering assistant, while it may further contain aluminum nitride (AlN) or titanium dioxide ($TiO_2$), and a material prepared from alumina ($Al_2O_3$), silicon carbide (SiC), zirconia ($ZrO_2$) or aluminum nitride (AlN).

Figure 6:
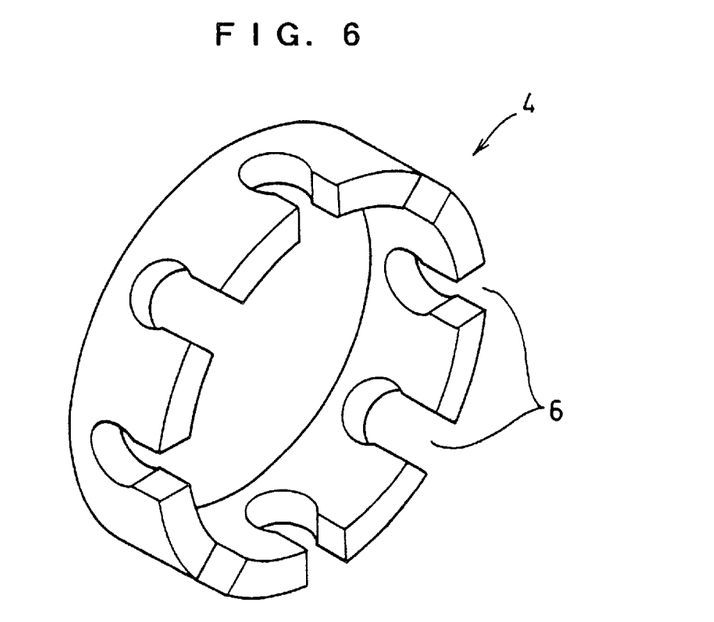
FIG. 6 is a perspective view of a bearing retainer according to a second preferred form of embodiment.
Figure 7:
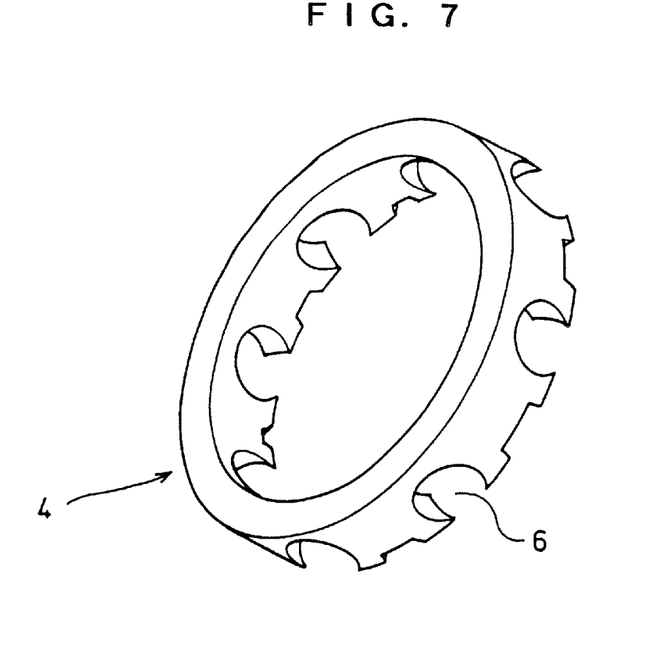
FIG. 7 is a perspective view of a bearing retainer according to a third preferred form of embodiment.

This invention is not limited to its forms of embodiment as described above, but covers a variety of further modifications or variations. Referring to the type of bearing, for example, the rolling bearing A, which has been described as an angular ball bearing, is not limited thereto. It may alternatively be, for example, another type of ball bearing, such as deep-groove ball bearing, or a cylindrical, needle, conical or spherical rolling bearing. The retainer 4 may be shaped like a crown, as shown in FIG. 6 or 7, depending on the type of bearing in which it is employed.

Figure 8:
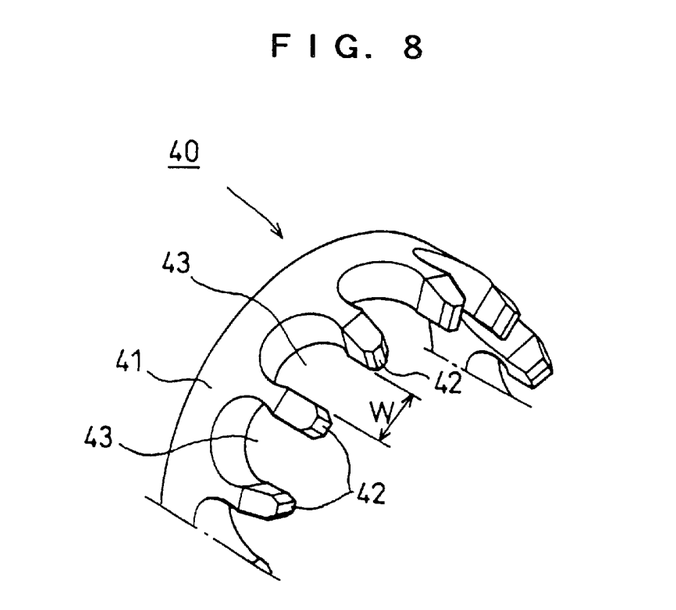
FIG. 8 is a perspective view of a bearing retainer according to a fourth preferred form of embodiment.
Figure 9:
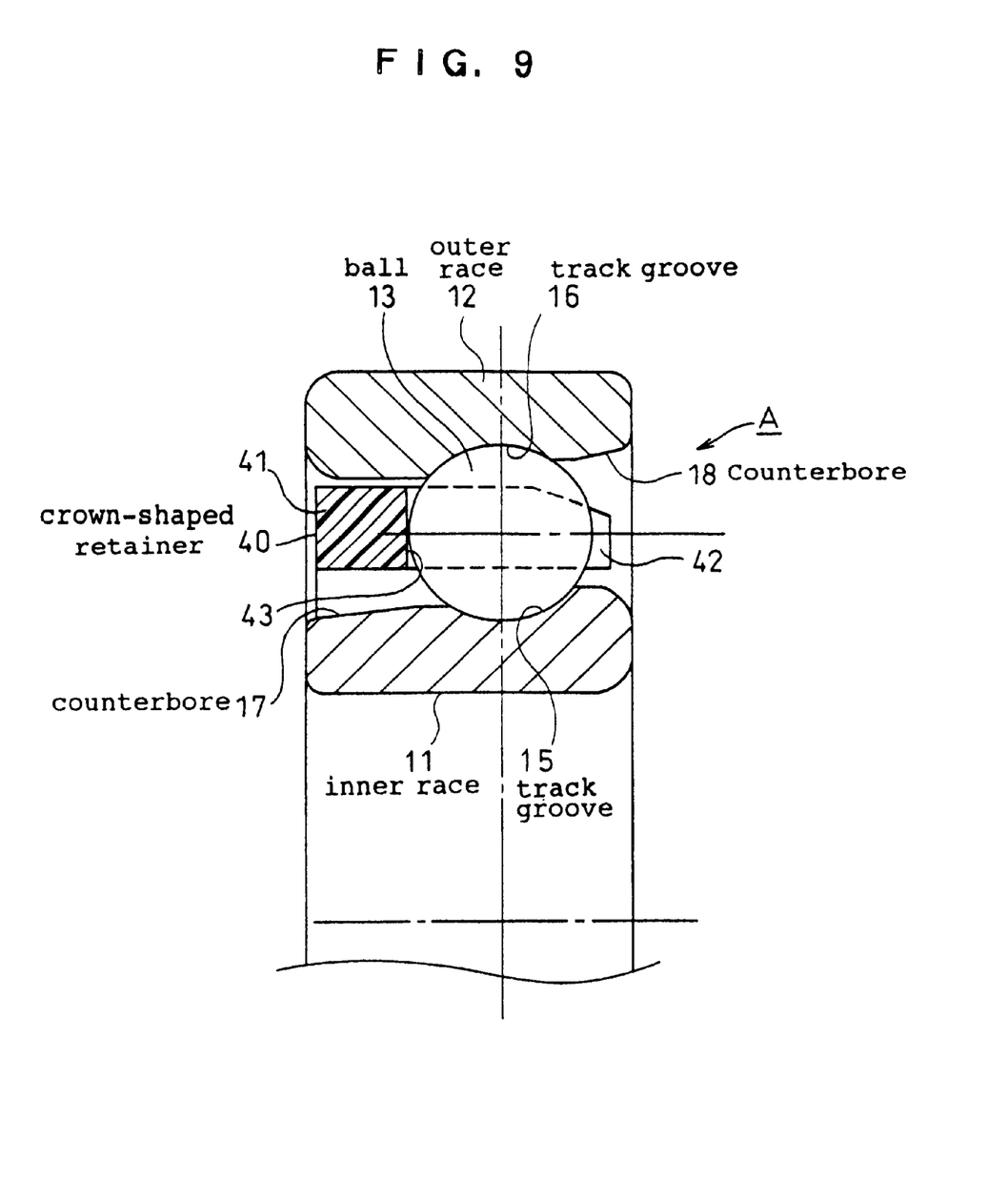
FIG. 9 is a longitudinal sectional view of an upper half of a rolling bearing including the retainer of FIG. 8.

Still another form of embodiment is shown in FIGS. 8 and 9. FIG. 8 shows a rolling bearing having a pair of track grooves 15 and 16 formed in the outer surface of an inner race 11 and the inner surface of an outer race 12, respectively, and slightly shifted from its axially central portion. Counterbores 17 and 18 are formed on the shoulder of the wider portion of the outer surface of the inner race 11 and the shoulder of the narrower portion of the inner surface of the outer race 12, respectively. The counterbores 17 and 18 are tapered from protrusions holding balls 13 in the track grooves 15 and 16, respectively.

FIG. 9 also shows a crown-shaped retainer 40 having an annular body 41, a plurality of circumferentially spaced apart lugs 42 projecting axially from the body 41 and a plurality of pockets 43 each defined between two adjoining lugs 42 for holding a ball therein, as shown in FIG. 8. The annular body 41 is guided on the shoulder of the wider portion of the inner surface of the outer race 12. Each lug 42 has an outer surface portion tapered toward its free end so as not to contact the outer race 12 when it is bent radially outwardly of the retainer by a centrifugal force resulting from its rotation. Every two adjoining lugs 42 have between their free ends a distance W which is slightly smaller than the diameter of the ball 13 to ensure that the ball 13 be held in the pocket 43, while the lugs 42 are chamfered or beveled at their free ends so that the balls 13 may be easily fitted in the pockets 43. The pocket 43 has a flat inner surface. The retainer 40 has a wall thickness and an axial width which depend on its desired strength. The track grooves 15 and 16 are so shifted toward one side of the bearing that the crown-shaped retainer 40 may not project from the inner and outer races 11 and 12.

Figure 10:
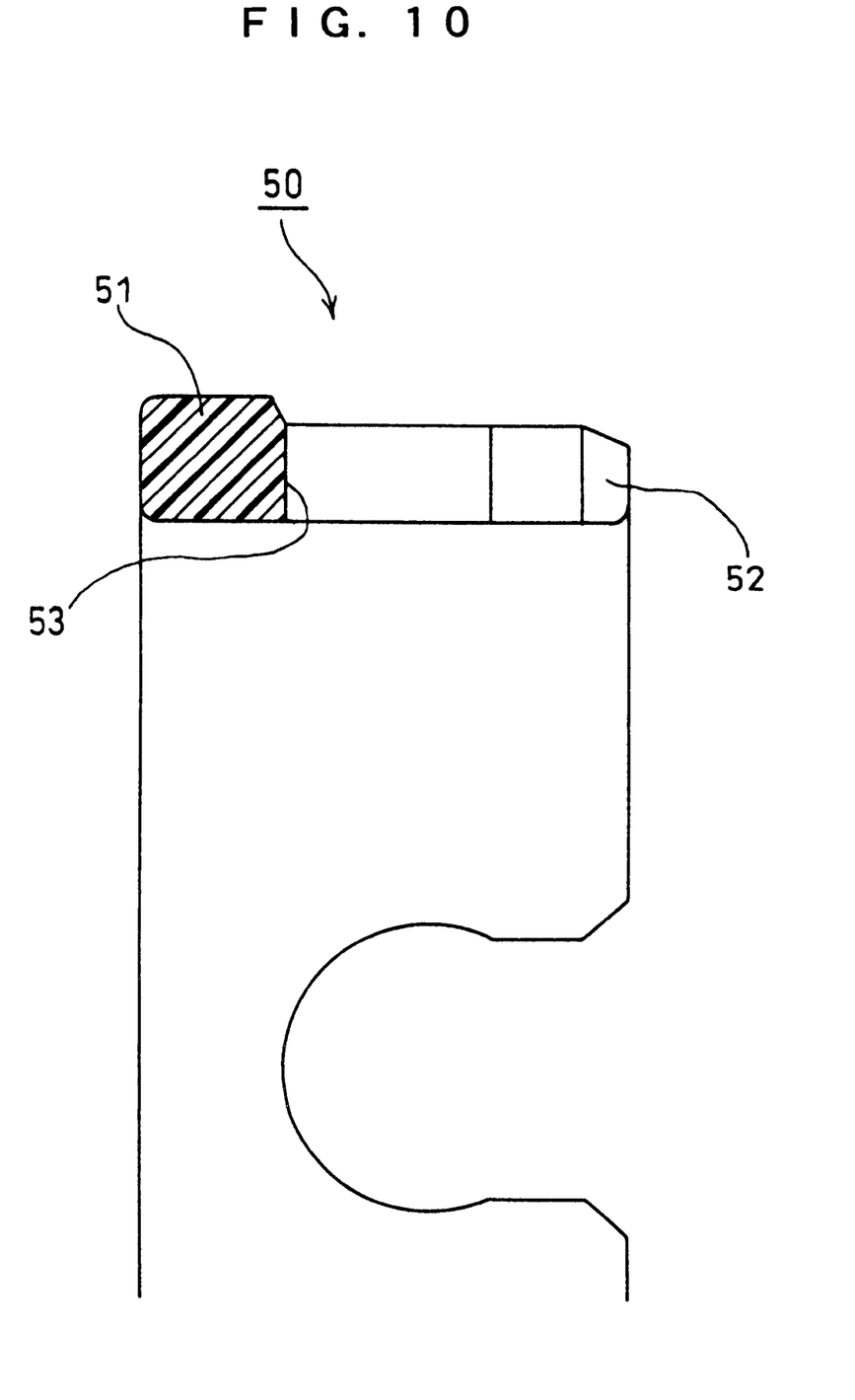
FIG. 10 is a perspective view of a bearing retainer according to a fifth preferred form of embodiment.
Figure 11:
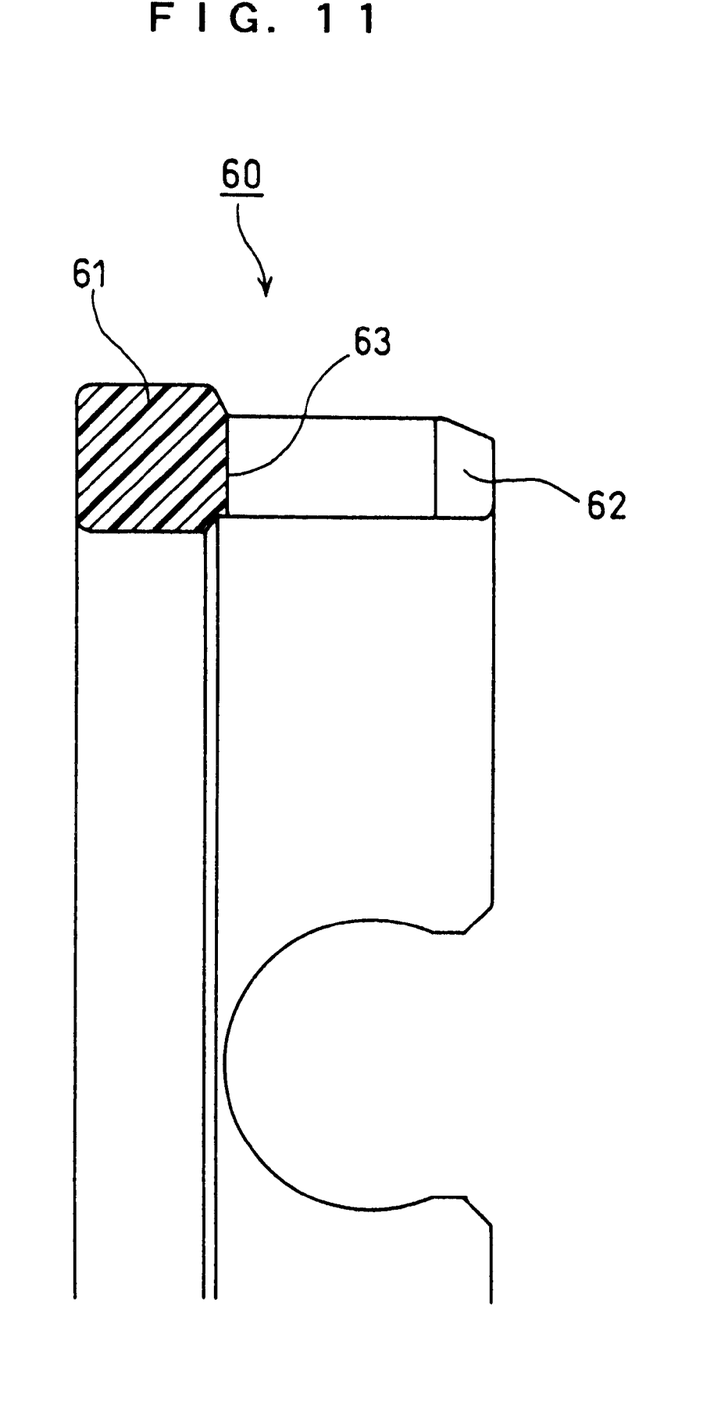
FIG. 11 is a perspective view of a bearing retainer according to a sixth preferred form of embodiment.

Modified forms of the retainer 40 shown in FIG. 9 are shown in FIGS. 10 and 11. The retainer 50 or 60 has a plurality of lugs 52 or 62 having a thickness as measured radially of the retainer which is smaller than the thickness of its annular body 51 or 61 as equally measured. The lugs 52 or 62 are correspondingly lighter in weight, and are less likely to be urged radially outwardly of the retainer by a centrifugal force to cause the balls to interfere with the inner surface of each of the pockets 53 and 63 and thereby affect the rotational performance of the rolling bearing adversely.

Figure 12:
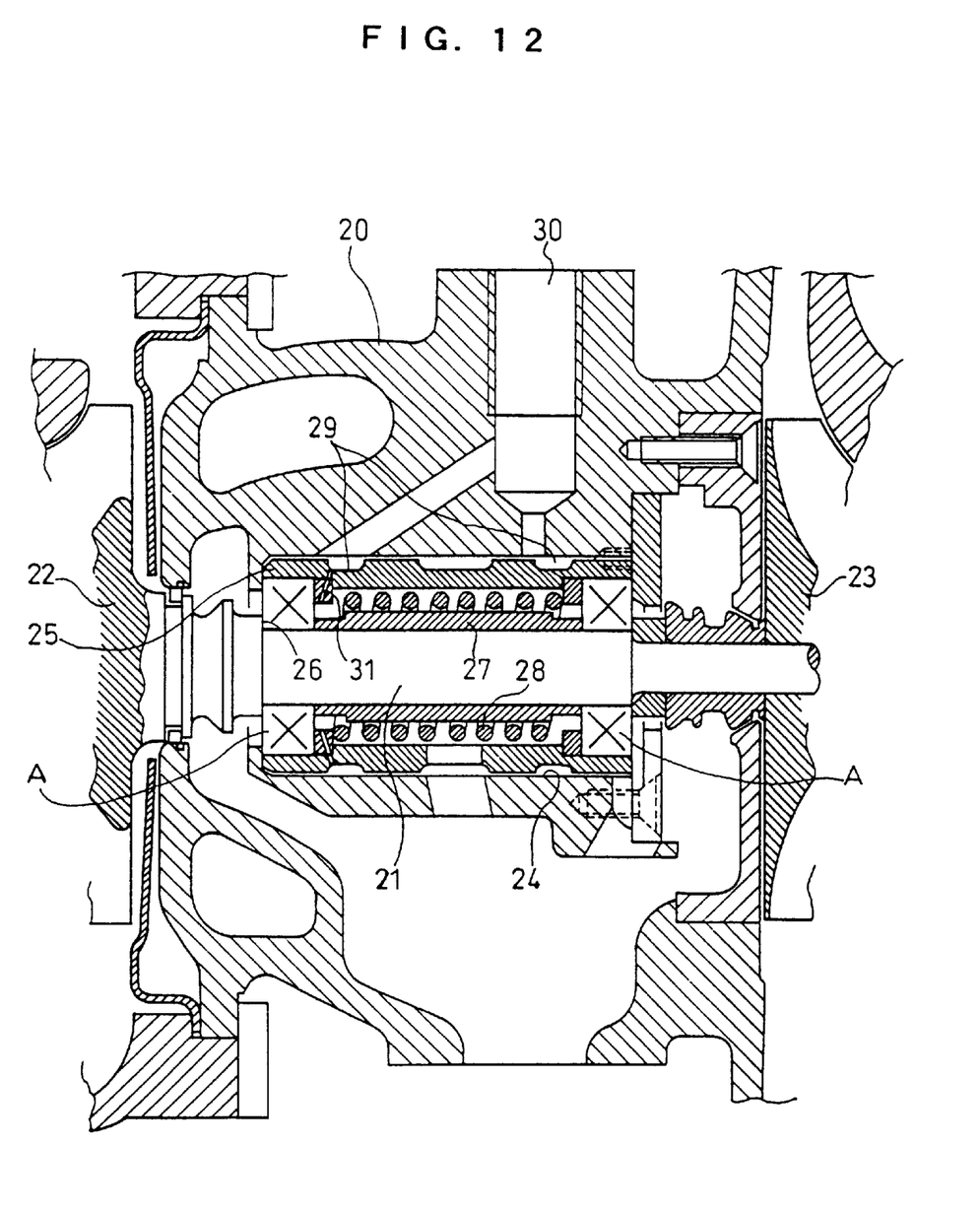
FIG. 12 is a longitudinal sectional view of a part of a supercharger including the rolling bearing as shown in FIG. 4.

The rolling bearing A as described above can be used in, for example, a supercharger for an automobile engine, a gas turbine, or a machine tool. FIG. 12 shows a supercharger in which two rolling bearings A as shown in FIG. 4 are employed. It has a housing 20 and a turbine shaft 21. A turbine wheel 22 is attached to one end of the turbine shaft 21, and a compressor wheel 23 to its other end. The housing 20 has a through hole 24 in which the turbine shaft 21 is rotatably supported by the rolling bearings A and a sleeve 25.

A description will now be made of the manner in which the rolling bearings A are incorporated in the supercharger. The inner race 1 of each bearing A is intermediately fitted about the turbine shaft 21 and held axially in position between a shoulder 26 on the shaft 21 and a spacer 27, while its outer race 2 is clearance fitted in the sleeve 25 and held against a shoulder on its inner surface, and a spacer is disposed between the outer races 2 of the two bearings A. The two bearings are so positioned that the shoulders of the outer races 2 having the counterbores 9 may face the turbine and compressor wheels 22 and 23, respectively. Therefore, FIG. 4 shows the bearing A facing the compressor wheel 23 in FIG. 12. The outer races 2 are axially urged away from each other by a coil spring 28 and the spacer. Thus, the two rolling bearings A are held under a fixed pressure, whereby the balls 3 of each bearing having a radial clearance are held at an angle in contact with the inner and outer races 1 and 2. The radial clearance is so controlled that the balls 3 may have a contact angle of, say, 150°±5°.

The sleeve 25 has an outside diameter which enables it to be appropriately spaced apart from the wall of the through hole 24 in the housing 20. The sleeve 25 has a plurality of circumferentially extending grooves 29 formed in its outer surface for defining as large a clearance between the sleeve 25 and the wall of the hole 24. This clearance is supplied with a lubricant through a port 30 in the housing 20, and the lubricant acts as a damper for the vibration of the turbine shaft 21. The sleeve 25 and spacer have small bores 31 through which the lubricant is jetted against the rolling bearings A. The lubricant is received in the counterbores 5 of the inner races 1 and flows through the bearings A for lubricating and cooling them.

The turbine shaft 21 is rotatable at a high speed not lower than 100,000 rpm, and reaches a temperature as high as 200° C. to 300° C. if the supercharger is continuously used. In spite of these severe conditions, the rolling bearings A exhibit a high seizure resistance owing to the specially selected materials of their components and support the turbine shaft 21 for rotation with a high stability.

As the supercharger has a higher temperature on its turbine side than on its compressor side, its durability can be further improved if the bearing on its turbine side includes a retainer prepared by turning and having a still higher heat resistance than the retainer 4 as described, while the retainer 4 is used in the bearing on the compressor side.

What is claimed is:

1. A synthetic resin retainer for a bearing for use at high speed and high temperatures which is formed from a material comprising at least a thermoplastic resin and particles of a heat-resisting resin, the thermoplastic resin and the particles of the heat-resisting resin being formed of different materials, wherein said thermoplastic resin is at least on selected from the group consisting of polyether ether ketone (PEEK), polyether ketone (PEEK), polyether sulfone (PES), polyether imide (PEI), polyamideimide (PAI), polyphenylene sulfide (PPS), polyallylether nitrile (PEN) and thermoplastic polyimide resin (TPI).

2. The retainer as set forth in claim 1, wherein said material further contains reinforcing fibers.

3. The retainer as set forth in claim 2, wherein the reinforcing fibers are at least one selected from the group consisting of carbon fibers, glass fibers, boron fibers, aramid fibers, silicon oxide fibers, silicon carbide fibers, silicon nitride fibers, alumina fibers, polyethylene fibers and polyallylate fibers.

4. The retainer as set forth in claim 1, wherein the material has been injection molded.

5. The retainer as set forth in claim 1, wherein said heat-resisting resin is polybenzimidazole (PBI).

6. The retainer as set forth in claim 1, which is applied to a supercharger for an automobile engine, a gas turbine or a machine tool.

7. The retainer as set forth in claim 1 which is counterbored having a plurality of circumferentially equally spaced apart and radially extending pockets and an annular groove formed in an axially central portion of an outer periphery of said retainer.

8. The retainer as set forth in claim 7, wherein a linear burr is formed such that the burr does not contact an inner diameter surface of an outer race.

9. The retainer as set forth in claim 1, wherein retainer is formed into a crown shape having an annular body, a plurality of circumferentially spaced apart lugs projecting axially from said body and a plurality of pockets each defined between two adjoining lugs for holding a ball therein, wherein an outer surface portion of said lug on a free end side is tapered toward said free end.

10. The retainer as set forth in claim 9, wherein said lugs are chamfered or beveled at their free ends.

11. The retainer as set forth in claim 9, wherein said lugs have a thickness as measured radially of said retainer which is smaller than a thickness of said annular body.

12. The retainer as set forth in claim 1, wherein the material comprises about 35% by weight of polyether ether ketone (PEEK) as the thermoplastic resin, about 35% by weight of polybenzimidazole (PBI) as the heat-resisting resin and about 30% by weight of carbon fibers as reinforcing fibers.

13. A method of manufacturing a retainer for a bearing and for use at high speed and high temperature, the method comprising:

injection molding a synthetic resin material, wherein said material comprises at least a thermoplastic resin and particles of a heat-resisting resin, the thermoplastic resin and the particles of the heat-resisting resin being formed of different materials, and said thermoplastic resin is at least one selected from the, group consisting of polyether ether ketone (PEEK), polyether ketone (PEK), polyether sulfone (PES), polyether imide (PEI), polyamideimide (PAI), polyphenylene sulfide (PPS), polyallylether nitrile (PEN) and thermoplastic polyimide resin (TPI).

14. The method as set forth in claim 13, wherein the retainer is used in a supercharger for an automobile engine, a gas turbine or a machine tool.

15. A rolling bearing for use at high speed and high temperature, the bearing; comprising an inner race, an outer race, a plurality of rolling elements disposed between said races and a retainer for holding Said rolling elements in position, said retainer being of a material comprising at least a thermoplastic resin and particles of a heat-resisting resin, the thermoplastic resin and the particles of the heat-resisting resin being formed of different materials, and said thermoplastic resin is at least one selected from the group consisting of polyether ether, ketone (PEEK), polyether ketone (PEK), polyether sulfone (PES), polyether imide (PEI), polyamideimide (PAI), polyphenylene sulfide (PPS), polyallylether nitrile (PEN) and thermoplastic polyimide resin (TPI).

16. The rolling bearing as set forth in claim 15, wherein the rolling bearing is used in a supercharger for an automobile engine, a gas turbine or a machine tool.

17. The rolling bearing as set forth in claim 15, wherein the inner race and the outer race are formed from high-carbon chromium bearing steel, a heat-resisting material or a ceramic material.

18. The rolling bearing as set forth in claim 17, wherein the heat resisting material is heat resisting high-carbon chromium bearing steel that comprises about 0.8–1.5% by weight of C, about 0.5–2.0% by weight of Si, 0.3–2.0% by weight of Mn, about 1.3–2.1% by weight of Cr and about 0.3–1.0% by weight of Mo, wherein Si and Mo make a total of at least 1.0% by weight.

19. The rolling bearing as met forth in claim 17, wherein the ceramic material comprises $Si_3N_4$.

20. The rolling bearing as set forth in claim 17, wherein the ceramic material further comprises at least one selected from the group consisting of $Y_2O_3$, $Al_2O_3$, AlN, $TiO_2$, SiC, and $ZrO_2$.

21. The rolling bearing as set forth in claim 15, wherein the material further contains reinforcing fibers.

22. The roller bearing as set forth in claim 13, wherein the material has been injection molded.

23. The roller bearing as set forth in claim 15, wherein said heat-resisting resin is polybenzimidazole (PBI).

* * * * *